(12) United States Patent
Hodotsuka et al.

(10) Patent No.: US 9,555,363 B2
(45) Date of Patent: Jan. 31, 2017

(54) CARBON DIOXIDE CAPTURE SYSTEM AND CARBON DIOXIDE CAPTURE METHOD

(71) Applicant: KABUSHIKI KAISHA TOSHIBA, Minato-ku (JP)

(72) Inventors: Masatoshi Hodotsuka, Saitama (JP); Satoshi Saito, Yamato (JP); Mitsuru Udatsu, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/967,609

(22) Filed: Dec. 14, 2015

(65) Prior Publication Data

US 2016/0339379 A1 Nov. 24, 2016

(30) Foreign Application Priority Data

May 18, 2015 (JP) .................................. 2015-101253

(51) Int. Cl.
*B01D 53/14* (2006.01)
*B01D 53/18* (2006.01)

(52) U.S. Cl.
CPC ........ *B01D 53/1425* (2013.01); *B01D 53/1475* (2013.01); *B01D 53/18* (2013.01)

(58) Field of Classification Search
CPC . B01D 53/1425; B01D 53/1475; B01D 53/18; B01D 53/00; B01D 53/14; B01D 53/1456
See application file for complete search history.

(56) References Cited

U.S. PATENT DOCUMENTS

| | | |
|---|---|---|
| 3,725,529 A | 4/1973 | Giammarco et al. |
| 4,160,810 A | 7/1979 | Benson et al. |
| 5,318,758 A | 6/1994 | Fujii et al. |

(Continued)

FOREIGN PATENT DOCUMENTS

| | | |
|---|---|---|
| AU | 2015207966 A1 | 5/2016 |
| WO | 2012/092982 A1 | 7/2012 |

OTHER PUBLICATIONS

Office Action issued Jul. 1, 2016 in Australian Patent Application No. 2015271884.

(Continued)

*Primary Examiner* — Duane Smith
*Assistant Examiner* — Cabrena Holecek
(74) *Attorney, Agent, or Firm* — Oblon, McClelland, Maier & Neustadt, L.L.P.

(57) ABSTRACT

An absorber of a carbon dioxide capture system according to an embodiment includes: a release region for releasing carbon dioxide from an absorbing liquid supplied from a stripper; and a second gas-liquid contact unit to which carbon dioxide released in the release region is supplied together with exhaust gas discharged from a first gas-liquid contact unit. The absorbing liquid having released the carbon dioxide therefrom in the release region is supplied to the second gas-liquid contact unit by an absorbing liquid supply device. The absorbing liquid having passed through the second gas-liquid contact unit is guided to the first gas-liquid contact unit while bypassing the release region. The second gas-liquid contact unit brings the exhaust gas and the absorbing gas into contact with each other so as to cause the carbon dioxide contained in the exhaust gas to be absorbed in the absorbing liquid.

8 Claims, 5 Drawing Sheets

(56) References Cited

U.S. PATENT DOCUMENTS

2013/0323147 A1* 12/2013 Iijima ................ B01D 53/1406
423/220
2014/0076166 A1  3/2014 Nakayama et al.
2014/0178279 A1  6/2014 Svendsen et al.

OTHER PUBLICATIONS

Extended European Search Report issued Sep. 26, 2016 in Application No. 15199856.4.

* cited by examiner

CARBON DIOXIDE CAPTURE SYSTEM AND CARBON DIOXIDE CAPTURE METHOD

CROSS-REFERENCE TO RELATED APPLICATIONS

This application is based upon and claims the benefit of priority from Japanese Patent Application No. 2015-101253, filed May 18, 2015; the entire contents of which are incorporated herein by reference.

FIELD

Embodiments described herein relate to a carbon dioxide capture system and a carbon dioxide capture method.

BACKGROUND

In recent years, a carbon dioxide capture and storage (CCS) technology for capturing and storing carbon dioxide ($CO_2$) has been drawn attention as a countermeasure against global warming. In general, a comparatively large amount of carbon dioxide is generated in thermal power plants, steel plants, cement plants, and other chemical industry installations and the like, and the concentration of carbon dioxide in the exhaust gas is comparatively high. When the carbon dioxide capture technique is applied to such an installation, therefore, carbon dioxide can be captured efficiently.

The carbon dioxide capture technique as above is classified as a chemical absorption method. Specifically, exhaust gas is supplied to an absorber, in which carbon dioxide contained in the exhaust gas is absorbed in an absorbing liquid. In this instance, the exhaust gas from which carbon dioxide has been released is discharged from the absorber as a treated gas. The absorbing liquid having absorbed carbon dioxide is supplied to a stripper, in which the carbon dioxide is released from the absorbing liquid and is separated and captured. The absorbing liquid from which the carbon dioxide has been released in the stripper is returned into the absorber.

However, in the stripper it is difficult to completely release carbon dioxide from the absorbing liquid. Specifically, carbon dioxide in an amount determined by gas-liquid equilibrium in the stripper may remain in a dissolved state in the absorbing liquid (lean liquid). For this reason, depending on the gas-liquid equilibrium in the absorber, there may be a situation in which part of the carbon dioxide dissolved in the lean liquid supplied from the stripper to the absorber is released from the lean liquid. Therefore, there is a possibility that the concentration of carbon dioxide in the treated gas discharged from the absorber is raised and the carbon dioxide capture rate is lowered.

DETAILED DESCRIPTION

Figure 1:
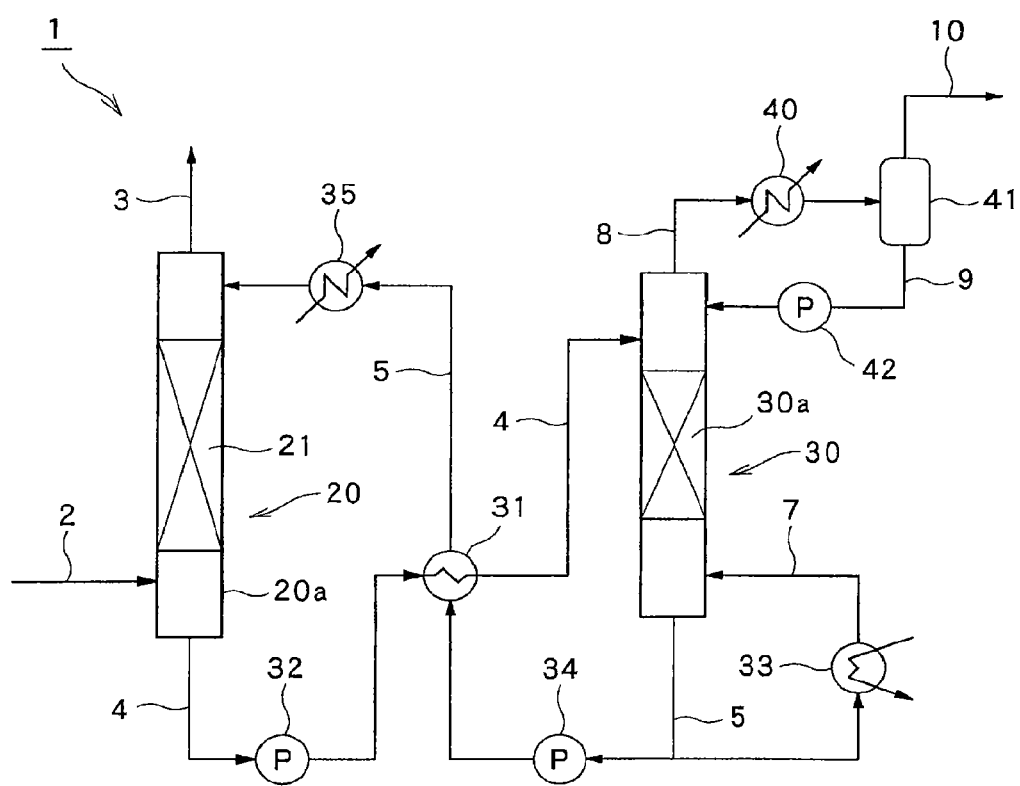
FIG. 1 is a diagram illustrating an overall configuration of a carbon dioxide capture system according to a first embodiment.

A carbon dioxide capture system according to an embodiment includes: an absorber having a first gas-liquid contact unit configured to bring exhaust gas and an absorbing liquid into contact with each other to cause carbon dioxide contained in the exhaust gas to be absorbed in the absorbing liquid; a stripper configured to permit the carbon dioxide to be released from the absorbing liquid containing the carbon dioxide, the absorbing liquid being supplied from the absorber. The absorber further has: a release region which is provided above the first gas-liquid contact unit, into which the absorbing liquid supplied from the stripper is introduced, and which is configured to allow the carbon dioxide to be released from the absorbing liquid; and a second gas-liquid contact unit which is provided above the release region, and into which the carbon dioxide released in the release region is supplied together with the exhaust gas discharged from the first gas-liquid contact unit. The absorbing liquid having released the carbon dioxide therefrom in the release region is supplied into the second gas-liquid contact unit by an absorbing liquid supply device. The absorbing liquid having passed through the second gas-liquid contact unit is guided by a guide member to the first gas-liquid contact unit while bypassing the release region. The second gas-liquid contact unit is configured to bring the exhaust gas and the absorbing liquid into contact with each other so as to cause the carbon dioxide contained in the exhaust gas to be absorbed in the absorbing liquid.

In addition, a method of capturing carbon dioxide according to an embodiment is a method of capturing carbon dioxide in a carbon dioxide capture system including an absorber and a stripper, the absorber having a first gas-liquid contact unit configured to bring exhaust gas and an absorbing liquid into contact with each other to permit the carbon dioxide contained in the exhaust gas to be absorbed in the absorbing liquid, and the stripper configured to release the carbon dioxide from the absorbing liquid having absorbed the carbon dioxide therein, the absorbing liquid being supplied from the absorber. In this method of capturing carbon dioxide, first, the absorbing liquid supplied from the stripper is introduced into a release region provided above the first gas-liquid contact unit, to release carbon dioxide from the absorbing liquid. Subsequently, the absorbing liquid having released the carbon dioxide therefrom in the release region is supplied to a second gas-liquid contact unit provided above the release region. Besides, the carbon dioxide released in the release region is supplied to the second gas-liquid contact unit together with the exhaust gas discharged from the first gas-liquid contact unit. In the second gas-liquid contact unit, the exhaust gas and the absorbing liquid contact each other, whereby the carbon dioxide contained in the exhaust gas is absorbed in the absorbing liquid. The absorbing liquid having passed through the second gas-liquid contact unit is guided to the first gas-liquid contact unit while bypassing the release region.

Referring to the drawings, a carbon dioxide capture system and a method of capturing carbon dioxide according to the embodiment of the present invention will now be described below.

First Embodiment

A carbon dioxide capture system and a method of capturing carbon dioxide according to a first embodiment will first be described referring to FIGS. 1 and 2.

As shown in FIG. 1, the carbon dioxide capture system 1 includes: an absorber (absorption column) 20 in which carbon dioxide contained in exhaust gas 2 is absorbed in an absorbing liquid; and a stripper (regeneration column) 30 configured to release the carbon dioxide from the absorbing liquid having absorbed the carbon dioxide therein, the absorbing liquid being supplied from the absorber 20, whereby the absorbing liquid is regenerated. The exhaust gas 2 having had the carbon dioxide absorbed in the absorbing liquid within the absorber 20 is discharged from the absorber 20 as a treated gas 3. In addition, the carbon dioxide is discharged from the stripper 30 together with steam as a carbon dioxide-containing steam 8. Note that the exhaust gas 2 supplied to the absorber 20 is not specifically restricted; for example, the exhaust gas 2 can be gas which is discharged, for example, from any of thermal power plants, steel plants, cement plants and other chemical industry installations and the like. The gas is supplied to the absorber 20 by use of a blower (not shown); in this case, the gas may be supplied to the absorber 20 after undergoing a cooling treatment, as required.

The absorbing liquid circulates in the absorber 20 and the stripper 30. In the absorber 20, the absorbing liquid absorbs carbon dioxide to become a rich liquid 4, and, in the stripper 30, the absorbing liquid releases the carbon dioxide therefrom to become a lean liquid 5. Note that the absorbing liquid is not particularly limited, and examples of compounds usable in the absorbing liquid include alcoholic hydroxyl group-containing primary amines such as monoethanolamine, 2-amino-2-methyl-1-propanol, etc.; alcoholic hydroxyl group-containing secondary amines such as diethnolamine, 2-methylaminoethanol, etc., alcoholic hydroxyl group-containing tertiary amines such as triethanolamine, N-methyldiethanolamine, etc., polyethylenepolyamines such as ethylenediamine, triethylenediamine, diethylenetriamine, etc.; cyclic amines such as piperazines, piperidines, pyrrolidines, etc.; polyamines such as xylenediamine, etc.; amino acids such as methylaminocarboxylic acid, etc., and their mixtures. These amines are normally used in the form of 10 to 70 wt % aqueous solutions thereof. Besides, to the absorbing liquid, there may be added a carbon dioxide absorption promoting agent or a corrosion inhibitor. Further, methanol, polyethylene glycol, sulfolane, etc. may also be added to the absorbing liquid as other medium.

The absorber 20 has a main body vessel 20a, and a first gas-liquid contact unit 21 (packed bed) which is accommodated in the main body vessel 20a and in which carbon dioxide contained in the exhaust gas 2 is absorbed in the lean liquid 5. Of these components, the main body vessel 20a is so configured as to accept the exhaust gas 2 via a lower portion thereof and to discharge the treated gas 3 via a top thereof. The first gas-liquid contact unit 21 is configured as a countercurrent gas-liquid contact device.

The exhaust gas 2 supplied into a lower portion of the main body vessel 20a of the absorber 20 ascends within the main body vessel 20a toward the first gas-liquid contact unit 21. On the other hand, the lean liquid 5 from the stripper 30 is dispersed and falls, to be supplied to the first gas-liquid contact unit 21. In the first gas-liquid contact unit 21, the exhaust gas 2 and the lean liquid 5 make gas-liquid contact with each other, whereby the carbon dioxide contained in the exhaust gas 2 is absorbed in the lean liquid 5, whereon the rich liquid 4 is produced. In this case, if the temperature of the lean liquid 5 is at a low level, the lean liquid 5 is enhanced in carbon dioxide absorbing ability.

The rich liquid 4 thus formed is temporarily stored in a lower portion of the absorber 20, and is discharged from the lower portion. The exhaust gas 2 having made gas-liquid contact with the lean liquid 5 is deprived of the carbon dioxide, before being discharged from the first gas-liquid contact unit 21 and ascending within the main body vessel 20a.

Between the absorber 20 and the stripper 30 is provided a heat exchanger 31. Between the absorber 20 and the heat exchanger 31 is provided a rich liquid pump 32. The rich liquid 4 discharged from the absorber 20 is supplied to the stripper 30 through the heat exchanger 31 by the rich liquid pump 32. In the heat exchanger 31, the rich liquid 4 supplied from the absorber 20 to the stripper 30 is put to heat exchange with the lean liquid 5 supplied from the stripper 30 to the absorber 20. As a result, the rich liquid 4 is heated up to a desired temperature, as the lean liquid 5 functions as a heat source. In other words, the lean liquid 5 is cooled down to a desired temperature, as the rich liquid 4 serves as a coldness source.

The stripper 30 has an amine stripping unit 30a (packed bed) configured to release carbon dioxide from the rich liquid 4. This amine stripping unit 30a is configured as a countercurrent gas-liquid contact device.

A reboiler 33 is connected to the stripper 30. In this reboiler 33, the lean liquid 5 supplied from the stripper 30 is heated by a heating medium, to produce steam 7, and the steam 7 thus formed is supplied to the stripper 30. More specifically, the reboiler 33 is supplied with part of the lean liquid 5 discharged from the lower portion of the stripper 30, and is supplied with high-temperature steam as a heating medium from an external component such as a turbine (not shown). The lean liquid 5 supplied to the reboiler 33 is heated through heat exchange with the heating medium, so that steam 7 is generated from the lean liquid 5. In this instance, carbon dioxide can also be released from the lean liquid 5. The steam 7 generated is supplied into a lower portion 30 together with the carbon dioxide, heats the rich liquid 4 inside the stripper 30, and thereby raising the temperature of the rich liquid 4. Note that the heating medium is not limited to the high-temperature steam supplied from the turbine.

The steam 7 is supplied from the reboiler 33 to a lower portion of the stripper 30, and ascends inside the stripper 30 toward the amine stripping unit 30a. On the other hand, the rich liquid 4 from the absorber 20 is dispersed and falls, to be supplied to the amine stripping unit 30a. In the amine stripping unit 30a, the rich liquid 4 and the steam 7 make gas-liquid contact with each other, whereby carbon dioxide is released from the rich liquid 4, with formation of the lean liquid 5. In this instance, if the temperature of the rich liquid 4 is high, the carbon dioxide can be efficiently released from the rich liquid 4. In this way, the absorbing liquid is regenerated in the stripper 30.

The lean liquid 5 thus formed is discharged via the lower portion of the stripper 30, whereas the steam 7 having undergone gas-liquid contact with the rich liquid 4 is discharged via the top of the stripper 30 as a carbon dioxide-containing steam 8 which further contains carbon dioxide.

Between the stripper 30 and the heat exchanger 31 is provided a lean liquid pump 34. The lean liquid 5 discharged from the stripper 30 is supplied to the absorber 20 through the heat exchanger 31 by the lean liquid pump 34. As aforementioned, in the heat exchanger 31, the lean liquid 5 supplied from the stripper 30 to the absorber 20 is cooled through heat exchange with the rich liquid 4 which is supplied from the absorber 20 to the stripper 30. In addition, between the heat exchanger 31 and the absorber 20, there is provided a lean liquid cooler 35 configured to cool the lean liquid 5 supplied from the stripper 30 (more particularly, the heat exchanger 31) to the absorber 20. The lean liquid cooler 35 is externally supplied with a cooling medium such as cooling water. The lean liquid cooler 35 cools the lean liquid 5 which has been cooled at the heat exchanger 31, further down to a desired temperature.

The lean liquid 5 cooled at the lean liquid cooler 35 is supplied to the first gas-liquid contact unit 21 in the absorber 20. In the first gas-liquid contact unit 21, the lean liquid 5 makes gas-liquid contact with the exhaust gas 2 so as to absorb the carbon dioxide contained in the exhaust gas 2, thereby turning into the rich liquid 4. In this manner, in the carbon dioxide capture system 1, the absorbing liquid circulates while repeatedly switching from being the lean liquid 5 to being the rich liquid 4.

The carbon dioxide capture system 1 shown in FIG. 1 further includes: a gas cooler 40 configured to cool the carbon dioxide-containing steam 8 discharged from the top of the stripper 30, thereby condensing the steam to produce condensed water 9; and a gas-liquid separator 41 configured to separate the condensed water 9, formed by the gas cooler 40, from the carbon dioxide-containing steam 8. In this way, the amount of water (moisture) contained in the carbon dioxide-containing steam 8 is reduced, and the gas is discharged from the gas-liquid separator 41 as a carbon dioxide gas 10. The carbon dioxide gas 10 thus discharged is supplied to and stored in equipment which is not shown in the drawing. On the other hand, the condensed water 9 separated at the gas-liquid separator 41 is supplied to the stripper 30 under its own weight or by a condensed water pump 42, to be mixed with the rich liquid 4. Note that the gas cooler 40 is externally supplied with a cooling medium (for example, cooling water) for cooling the carbon dioxide-containing steam 8.

Now, the absorber 20 will be described in detail below, referring to FIG. 2.

Figure 2:
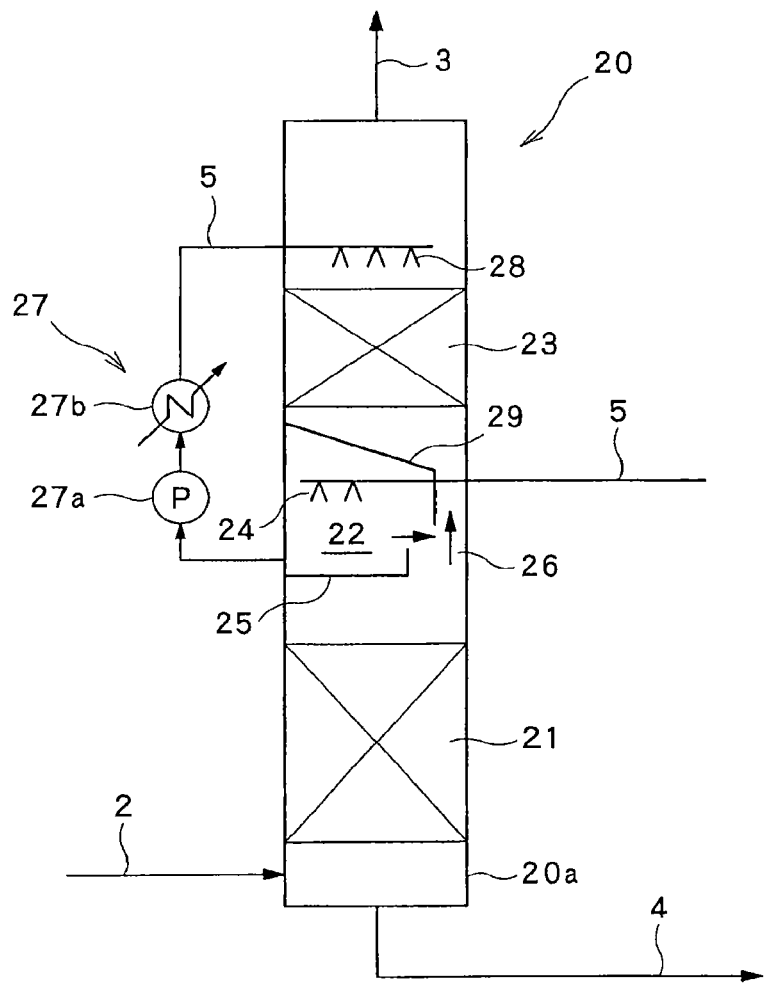
FIG. 2 is a diagram illustrating a detailed structure of an absorber in FIG. 1.

As illustrated in FIG. 2, the absorber 20 further includes: a release region 22 provided above the first gas-liquid contact unit 21; and a second gas-liquid contact unit 23 (packed bed) provided above the release region 22. The release region 22 and the second gas-liquid contact unit 23 are accommodated in the main body vessel 20a. The second gas-liquid contact unit 23 is configured as a countercurrent gas-liquid contact device, like the first gas-liquid contact unit 21.

In the release region 22, the lean liquid 5 supplied from the stripper 30 (more specifically, from the lean cooler 35) is introduced, and carbon dioxide is released from the lean liquid 5. The release region 22 is provided with a first liquid disperser 24. The first liquid disperser 24 preferably introduces the supplied lean liquid 5 by spraying the lean liquid 5 into the release region 22. In this case, the surface area of the lean liquid 5 is increased, whereby the carbon dioxide can be efficiently released from the lean liquid 5.

In the present embodiment, a storage unit 25 for storing the lean liquid 5 introduced into the release region 22 is provided below the release region 22 and above the first gas-liquid contact unit 21. It is sufficient that the storage unit 25 accept at least part of the lean liquid 5 introduced from the first liquid disperser 24 into the release region 22.

The carbon dioxide released within the release region 22 ascends in the main body vessel 20a accompanying the exhaust gas 2 discharged from the first gas-liquid contact unit 21, and is supplied to the second gas-liquid contact unit 23. To be more specific, in the embodiment depicted in FIG. 2, a gas flow path region 26 permitting the exhaust gas 2 discharged from the first gas-liquid contact unit 21 to ascend therethrough is formed at a lateral side of the storage unit 25. Through the gas flow path region 26, the carbon dioxide released in the release region 22 ascends toward the second gas-liquid contact unit 23, accompanied by the ascending exhaust gas 2.

On the other hand, the lean liquid 5 introduced into the release region 22 and having released the carbon dioxide therefrom is supplied to the second gas-liquid contact unit 23 by an absorbing liquid supply device 27. In this embodiment, the absorbing liquid supply device 27 includes a supply pump 27a for supplying the lean liquid 5 stored in the storage unit 25 to a second liquid disperser 28 (described later), and a supply cooler 27b for cooling the lean liquid 5 supplied to the second liquid disperser 28.

The second liquid disperser 28 which is supplied with the lean liquid 5 from the absorbing liquid supply device 27 is provided above the second gas-liquid contact unit 23. The second liquid disperser 28 is configured to permit the supplied lean liquid 5 to be dispersed and fall to the second gas-liquid contact unit 23, whereby the lean liquid 5 is supplied to the second gas-liquid contact unit 23. The second gas-liquid contact unit 23 brings the exhaust gas 2 and the lean liquid 5 into contact with each other so that the carbon dioxide contained in the exhaust gas 2 is absorbed in the lean liquid 5.

As illustrated in FIG. 2, the absorber 20 further includes a guide member 29 by which the lean liquid 5 having passed through the second gas-liquid contact unit 23 is guided to the first gas-liquid contact unit 21 while bypassing the release region 22. In the present embodiment, the guide member 29 is provided inside the main body vessel 20a, and is so formed as to cover the release region 22 from above. By this structure, the lean liquid 5 having absorbed the carbon dioxide within the second gas-liquid contact unit 23 is prevented from flowing down into the release region 22. In addition, as depicted in FIG. 2, the guide member 29 may be so formed as to extend obliquely downward from above the release region 22 (or the storage unit 25) toward the gas flow path region 26. In this case, the release region 22 is formed to be protuberant upward, whereby the lean liquid 5 guided by the guide member 29 is more reliably prevented from being supplied into the release region 22. The guide member 29 according to this embodiment guides the lean liquid 5 into the aforementioned gas flow path region 26 provided at a lateral side of the storage unit 25. In this way, the lean liquid 5 having passed through the second gas-liquid contact unit 23 is prevented from being supplied into the release region 22. Note that the shape of the guide member 29 is not limited to the shape depicted in FIG. 2, so long as the guide member 29 can guide the lean liquid 5, having absorbed the carbon dioxide from the exhaust gas 2 at the second gas-liquid contact unit 23, to the first gas-liquid contact unit 21 while bypassing the release region 22. In addition, the provision of the guide member 29 inside the main body vessel 20a is not restrictive.

Operation of the present embodiment configured as above will be described below.

During an operation of the carbon dioxide capture system 1, the lean liquid 5 supplied from the stripper 30 (see FIG. 1) is supplied to the first liquid disperser 24 in the absorber 20, as shown in FIG. 2. The lean liquid 5 supplied to the first liquid disperser 24 is introduced into the release region 22 from the first liquid disperser 24.

Meanwhile, in the stripper 30, it is generally difficult to completely discharge the carbon dioxide from the rich liquid 4. For this reason, in the lean liquid 5 supplied from the stripper 30 to the absorber 20, carbon dioxide may remain in a dissolved state. In the case where the partial pressure of carbon dioxide in the release region 22 is low, the carbon dioxide having been dissolved in the lean liquid 5 is released from the lean liquid 5 introduced into the release region 22, in such a manner that a gas-liquid equilibrium is maintained.

The carbon dioxide released in the release region 22 flows toward the gas flow path region 26 formed at a lateral side of the storage unit 25. In the present embodiment, the release region 22 is so formed as to be protuberant to the upper side. Even in this case, when the release region 22 is filled up with the carbon dioxide released in the release region 22, the carbon dioxide in the release region 22 comes to be pushed out into the gas flow path region 26. On the other hand, the exhaust gas 2 from which the carbon dioxide has been released in the first gas-liquid contact unit 21 is discharged from the first gas-liquid contact unit 21 and ascends within the gas flow path region 26. By this process, the carbon dioxide reaching the gas flow path region 26 ascends within the gas flow path region 26 accompanying the exhaust gas 2, to be supplied to the second gas-liquid contact unit 23.

In addition, the lean liquid 5 having released the carbon dioxide therefrom in the release region 22 is stored in the storage unit 25. The lean liquid 5 thus stored has a comparatively low carbon dioxide concentration, since the carbon dioxide has been released from the lean liquid 5. The lean liquid 5 is supplied to the second liquid disperser 28 by the supply pump 27a of the absorbing liquid supply device 27. In this instance, the lean liquid 5 is cooled by the supply cooler 27b. The lean liquid 5 supplied to the second liquid disperser 28 is dispersed and falls from the second liquid disperser 28, to be supplied to the second gas-liquid contact unit 23.

In the second gas-liquid contact unit 23, the exhaust gas 2 having ascended through the gas flow path region 26 and the lean liquid 5 having been dispersed and fallen from the second liquid disperser 28 make gas-liquid contact with each other, whereby carbon dioxide contained in the exhaust gas 2 is absorbed in the lean liquid 5. The lean liquid 5 supplied to the second gas-liquid contact unit 23 has a comparatively lowered concentration of carbon dioxide, and, therefore, has a comparatively high carbon dioxide absorbing ability. Besides, the temperature of the lean liquid 5 is low, since the lean liquid 5 has been cooled. For this reason, also, the lean liquid 5 supplied to the second gas-liquid contact unit 23 has an enhanced ability to absorb carbon dioxide. Therefore, the carbon dioxide contained in the exhaust gas 2 can be absorbed efficiently. The lean liquid 5 having absorbed the carbon dioxide in the second gas-liquid contact unit 23 has an enhanced concentration of carbon dioxide.

The lean liquid 5 having passed through the second gas-liquid contact unit 23 and having a comparatively high concentration of carbon dioxide is guided by the guide member 29 into the gas flow path region 26. The lean liquid 5 guided into the gas flow path region 26 flows down from the gas flow path region 26 toward the first gas-liquid contact unit 21. Owing to this process, the lean liquid 5 having passed through the second gas-liquid contact unit 23 is supplied to the first gas-liquid contact unit 21 while bypassing the release region 22, so that the lean liquid 5 is prevented from being supplied to the release region 22. In other words, the lean liquid 5 having a carbon dioxide concentration enhanced when passing through the second gas-liquid contact unit 23 is prevented from mixing with the lean liquid 5 having a comparatively low carbon dioxide concentration and stored in the storage unit 25. Consequently, the carbon dioxide absorbing ability of the lean liquid 5 supplied to the second gas-liquid contact unit 23 is prevented from being lowered.

The lean liquid 5 having flowed down to the first gas-liquid contact unit 21 makes gas-liquid contact with the exhaust gas 2 supplied to a lower portion of the main body vessel 20a of the absorber 20. Since the exhaust gas 2 supplied to the first gas-liquid contact unit 21 contains a comparatively large amount of carbon dioxide, even the lean liquid 5 which has absorbed carbon dioxide within the second gas-liquid contact unit 23 can efficiently absorb the carbon dioxide from the exhaust gas 2. In addition, the temperature of the lean liquid 5 is still low, which also contributes to efficient absorption of carbon dioxide.

On the other hand, the exhaust gas 2 from which carbon dioxide has been released in the second gas-liquid contact unit 23 is discharged from the second gas-liquid contact unit 23 and ascends, to be discharged via the top of the main body vessel 20a of the absorber 20 to the exterior as a treated gas 3. The treated gas 3 has a lowered concentration of carbon dioxide, since the carbon dioxide is absorbed in the lean liquid 5 in the second gas-liquid contact unit 23 as aforementioned.

Thus, according to the present embodiment, the lean liquid 5 supplied from the stripper 30 to the absorber 20 can absorb and capture the carbon dioxide, which has been released in the release region 22, at the second gas-liquid contact unit 23 provided above the release region 22. This ensures that the treated gas 3 discharged from the absorber 20 can be lowered in carbon dioxide concentration. Consequently, carbon dioxide capture rate can be enhanced.

In addition, according to the present embodiment, the lean liquid 5 having passed through the second gas-liquid contact unit 23 so as to acquire a comparatively high carbon dioxide concentration can be supplied to the first gas-liquid contact unit 21 while bypassing the release region 22, under the function of the guide member 29. This ensures that the lean liquid 5 whose carbon dioxide concentration has been enhanced can be prevented from mixing into the lean liquid 5 whose carbon dioxide concentration has been made to be comparatively low by releasing the carbon dioxide in the release region 22. Therefore, the lean liquid 5 with a low carbon dioxide concentration can be supplied to the second gas-liquid contact unit 23, so that the carbon dioxide absorbing performance of the lean liquid 5 in the second gas-liquid contact unit 23 can be enhanced. As a consequence, carbon dioxide capture rate in the second gas-liquid contact unit 23 can be enhanced.

Furthermore, according to this embodiment, the lean liquid 5 supplied from the storage unit 25 to the second gas-liquid contact unit 23 is cooled by the supply cooler 27b. For this reason, the temperature of the lean liquid 5 supplied to the second gas-liquid contact unit 23 can be lowered, and the carbon dioxide absorbing ability of the lean liquid 5 at the second gas-liquid contact unit 23 can be enhanced. Accordingly, the carbon dioxide capture rate can be enhanced more.

Second Embodiment

A carbon dioxide capture system and a method of capturing carbon dioxide according to a second embodiment of the present invention will now be described below, referring to FIG. 3.

Figure 3:
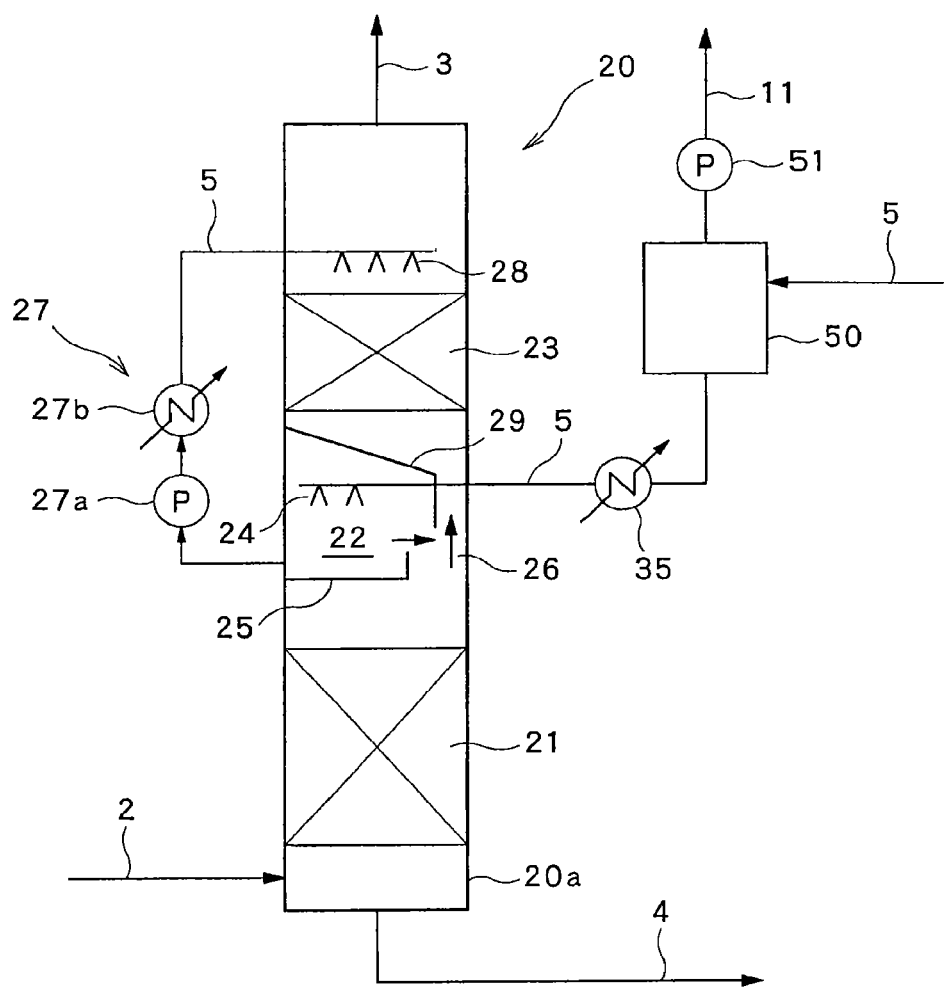
FIG. 3 is a diagram illustrating a detailed structure of an absorber in a second embodiment.

The second embodiment depicted in FIG. 3 differs from the first embodiment illustrated in FIGS. 1 and 2 mainly in that the carbon dioxide capture system further includes a decompression vessel in which an absorbing liquid supplied from a stripper to an absorber is flashed, thereby releasing carbon dioxide from the absorbing liquid. In other points of configuration, the second embodiment is substantially the same as the first embodiment. Note that, in FIG. 3, components having functions equivalent or similar to those in the first embodiment depicted in FIGS. 1 and 2 are denoted by the same reference signs as used above, and detailed description of those components is omitted.

As illustrated in FIG. 3, a carbon dioxide capture system 1 according to the present embodiment further includes a decompression vessel 50 in which a lean liquid 5 supplied from a stripper 30 to an absorber 20 is flashed (subjected to gas-liquid separation in decompression (or in vacuum)) so as to release carbon dioxide from the lean liquid 5, thereby capturing the carbon dioxide. More specifically, it is preferable that the decompression vessel 50 be disposed between a heat exchanger 31 and an absorber 20 so as to flash the lean liquid 5 discharged from the heat exchanger 31 and supplied to the absorber 20. In this case, the lean liquid 5 having been cooled at the heat exchanger 31 is flashed.

A lean liquid cooler 35 as aforementioned is disposed between the decompression vessel 50 and the absorber 20. In other words, the decompression vessel 50 is disposed between the heat exchanger 31 and the lean liquid cooler 35. The lean liquid cooler 35 is configured to cool the lean liquid 5 supplied from the decompression vessel 50 to the absorber 20, thereby cooling the lean liquid 5 which has been discharged from the decompression vessel 50 but not yet been supplied to the absorber 20. In this case, a situation in which the lean liquid 5 to be supplied to the decompression vessel 50 is cooled by the lean liquid cooler 35 is avoided.

In addition, as shown in FIG. 3, the carbon dioxide capture system 1 according to this embodiment further includes an exhaust pump 51 (exhaust driving unit) for exhausting carbon dioxide released inside the decompression vessel 50. With the exhaust pump 51 driven, carbon dioxide in the decompression vessel 50 is exhausted and recovered as a carbon dioxide gas 11. Besides, with the exhaust pump 51 driven, the pressure inside the decompression vessel 50 is lowered, and a reduced pressure condition is maintained inside the decompression vessel 50. As a result, the lead liquid 5 supplied into the decompression vessel 50 can be flashed efficiently.

Thus, according to the present embodiment, the lean liquid 5 supplied from the stripper 30 to the absorber 20 is flashed in the decompression vessel 50, whereby carbon dioxide is released from the lean liquid 5 and captured. As a result, carbon dioxide capture rate can be enhanced. In addition, the carbon dioxide concentration of the lean liquid 5 supplied to the first liquid disperser 24 of the absorber 20 can be lowered. As a consequence, the amount of carbon dioxide released within the release region 22 can be reduced, and the carbon dioxide concentration of the exhaust gas 2 supplied to the second gas-liquid contact unit 23 can be lowered. For this reason, the carbon dioxide concentration of the treated gas 3 discharged from the absorber 20 can be further lowered, and carbon dioxide capture rate can be further enhanced.

Besides, according to this embodiment, the lean liquid cooler 35 for cooling the lean liquid 5 supplied from the heat exchanger 31 to the absorber 20 is disposed between the decompression vessel 50 and the absorber 20. This structure ensures that comparing with installing the lean liquid cooler 35 between the heat exchanger 31 and the decompression vessel 50, the temperature of the lean liquid 5 supplied to the decompression vessel 50 can be kept warm, and the lean liquid 5 can be efficiently flashed inside the decompression vessel 50.

Further, according to the present embodiment, the carbon dioxide discharged into the decompression vessel 50 is exhausted by the exhaust pump 51. This ensures that the pressure inside the decompression vessel 50 can be further lowered, and the lean liquid 5 can be efficiently flashed within the decompression vessel 50.

Third Embodiment

Now, a carbon dioxide capture system and a method of capturing carbon dioxide according to a third embodiment of the present invention will be described below, referring to FIG. 4.

Figure 4:
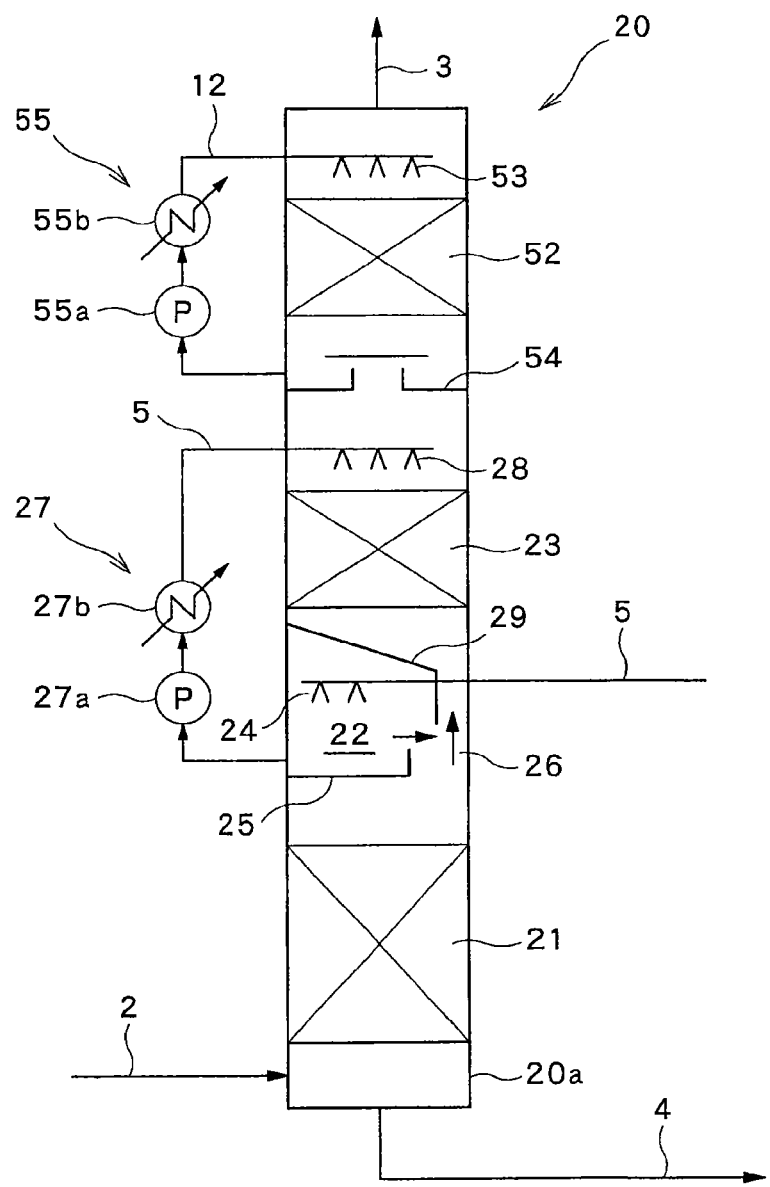
FIG. 4 is a diagram illustrating a detailed structure of an absorber in a third embodiment.

The third embodiment depicted in FIG. 4 differs from the first embodiment illustrated in FIGS. 1 and 2 mainly in that the absorber further includes a third gas-liquid contact unit provided above a second gas-liquid contact unit. In other points of configuration, the third embodiment is substantially the same as the first embodiment. Note that, in FIG. 4, components having functions equivalent or similar to those in the first embodiment depicted in FIG. 1, and detailed description of those components is omitted.

An absorber 20 in the present embodiment further includes a third gas-liquid contact unit 52 provided above a second gas-liquid contact portion 23, as depicted in FIG. 4. The third gas-liquid contact unit 52 is accommodated in a main body vessel 20a, and brings an exhaust gas 2 discharged from the second gas-liquid contact unit 23 and a cleaning liquid 12 into gas-liquid contact with each other, whereby carbon dioxide contained in the exhaust gas 2 is absorbed in the cleaning liquid 12. The cleaning liquid 12 is not particularly limited. For example, water or a material equivalent or similar to the aforementioned absorbing liquid (rich liquid 4, lean liquid 5) can be used as the cleaning liquid 12.

Above the third gas-liquid contact unit 52 is provided a third liquid disperser 53 permitting the cleaning liquid 12 to be dispersed and fall. The third liquid disperse 53 permits the supplied cleaning liquid 12 to be dispersed and fall toward the third gas-liquid contact unit 52 so that the cleaning liquid 12 is supplied to the third gas-liquid contact unit 52. On the other hand, below the third gas-liquid contact unit 52 is provided a second storage unit 54 for storing the cleaning liquid 12 flowing down from the third gas-liquid contact unit 52.

The cleaning liquid 12 in the third gas-liquid contact unit 52 is circulated by a circulation device 55. Specifically, in this embodiment, the circulation device 55 includes a circulation pump 55a for supplying the third liquid disperser 53 with the cleaning liquid 12 stored in the second storage unit 54, and a circulation cooler 55b for cooling the cleaning liquid 12 to be supplied to the third liquid disperser 53.

By the configuration as above, the cleaning liquid 12 stored in the second storage unit 54 of the third gas-liquid contact unit 52 is supplied to the third liquid disperser 53 by the circulation pump 55a of the circulation device 55. In this instance, the cleaning liquid 12 is cooled by the circulation cooler 55b. The cleaning liquid 12 supplied to the third liquid disperser 53 is dispersed and falls from the third liquid disperser 53, to be supplied to the third gas-liquid contact unit 52. On the other hand, the exhaust gas 2 discharged from the second gas-liquid contact unit 23 ascends within the main body vessel 20a of the absorber 20, to be supplied to the third gas-liquid contact unit 52.

In the third gas-liquid contact unit 52, the exhaust gas 2 having ascended from the second gas-liquid contact unit 23 and the cleaning liquid 12 having been dispersed and fallen from the third liquid disperser 53 make gas-liquid contact with each other, whereby carbon dioxide contained in the exhaust gas 2 is absorbed in the cleaning liquid 12. The cleaning liquid 12 having absorbed the carbon dioxide flows down from the third gas-liquid contact unit 52, to be stored in a second storage unit 54. The cleaning liquid 12 stored in the second storage unit 54 is again supplied to the third liquid disperser 53 by the circulation device 55. In this manner, the cleaning liquid 12 is circulated.

The cleaning liquid 12, by circulating, repeats absorption of carbon dioxide in the third gas-liquid contact unit 52. By this operation, the carbon dioxide concentration of the cleaning liquid 12 is raised gradually. In view of this, a configuration may be adopted wherein a physical property value (for example, density, pH, or viscosity) of the cleaning liquid 12 is measured, and when the measured physical property value has reached a predetermined reference value, a fresh cleaning liquid 12 is added to the cleaning liquid 12, and a surplus of cleaning liquid 12 is discharged. Or, alternatively, the cleaning liquid 12 raised in carbon dioxide concentration may be replaced by a fresh cleaning liquid 12. By such an operation, the carbon dioxide absorbing ability of the cleaning liquid 12 can be improved. Note that the cleaning liquid 12 thus discharged or replaced may be used by mixing it with the lean liquid 5, if the carbon dioxide concentration of the cleaning liquid 12 is lower than the carbon dioxide concentration of the lean liquid 5.

On the other hand, the exhaust gas 2 from which carbon dioxide has been absorbed at the third gas-liquid contact unit 52 is discharged from the third gas-liquid contact unit 52 and ascends, to be exhausted to the exterior as a treated gas 3 via the top of the main body vessel 20*a* of the absorber 2. Since the carbon dioxide contained in the treated gas 3 is further absorbed in the cleaning liquid 12 at the third gas-liquid contact unit 52 as aforementioned, the carbon dioxide concentration of the treated gas 3 is at a further lowered level.

Thus, according to the present embodiment, at the third gas-liquid contact unit 52, the cleaning liquid 12 can absorb and capture the carbon dioxide contained in the exhaust gas 2 discharged from the second gas-liquid contact unit 23. This ensures that the carbon dioxide concentration of the treated gas 3 discharged from the absorber 20 can be further lowered. Consequently, the carbon dioxide capture rate can further be enhanced.

In addition, according to this embodiment, the cleaning liquid 12 supplied from the second storage unit 54 to the third gas-liquid contact unit 52 is cooled by the circulation cooler 55*b*. By this operation, the temperature of the cleaning liquid 12 to be supplied to the third gas-liquid contact unit 52 can be lowered, so that the carbon dioxide capturing ability of the cleaning liquid 12 at the third gas-liquid contact unit 52 can be enhanced. For this reason, the carbon dioxide concentration of the treated gas 3 can be further lowered.

Figure 5:
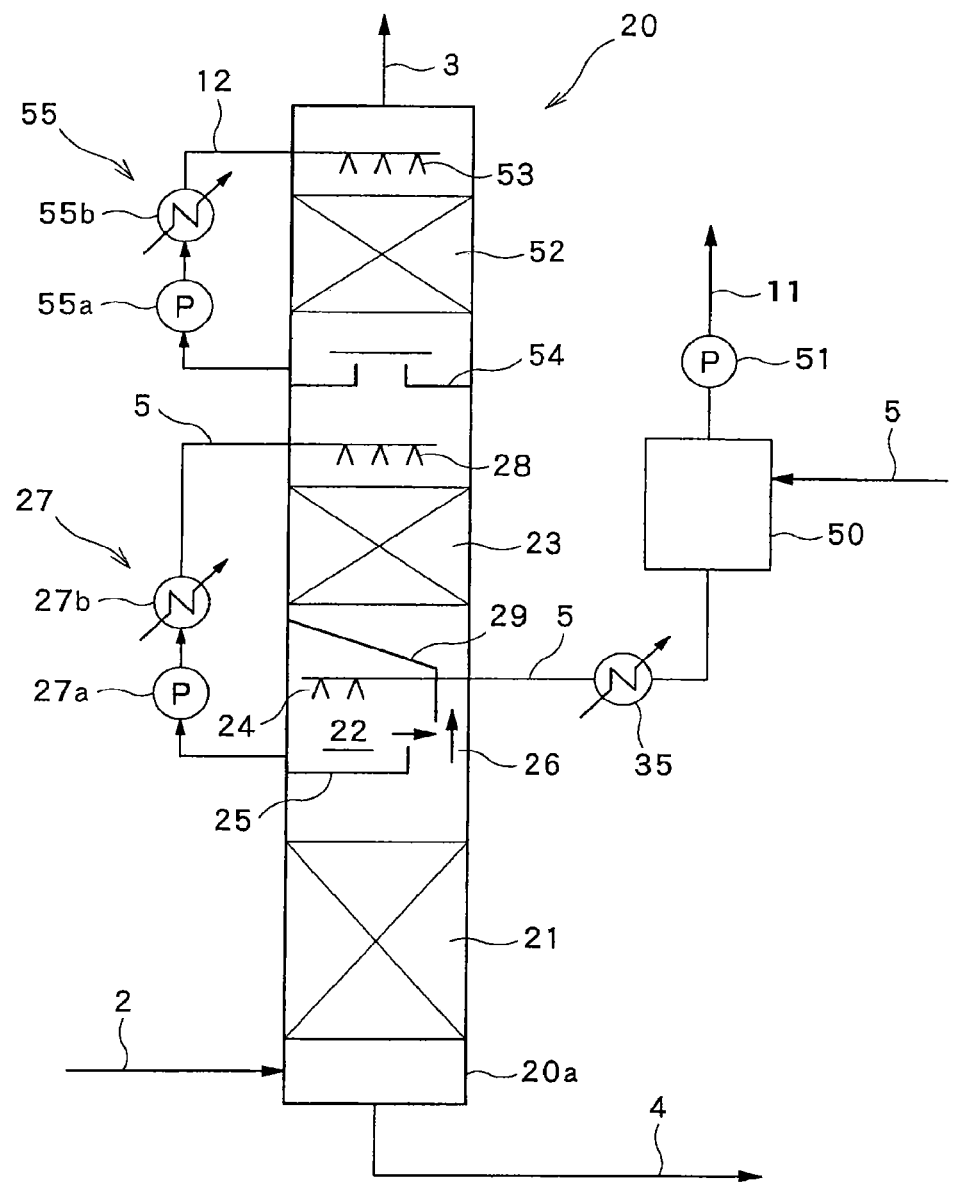
FIG. 5 is a diagram illustrating a detailed structure of an absorber as a modification of the absorber in FIG. 4.

Note that in this third embodiment as above, like in the first embodiment, description has been made of an example wherein the lean liquid 5 discharged from the heat exchanger 31 is supplied to the first liquid disperser 24 of the absorber 20 via the lean cooler 35. This, however, is not restrictive, and other configurations may also be adopted. For example, as shown in FIG. 5, the lean liquid to be supplied to the first liquid disperser 24 may be flashed in a decompression vessel 50. The embodiment depicted in FIG. 5 is a combination of this third embodiment with the second embodiment depicted in FIG. 3. In this case, the carbon dioxide capture rate can be further enhanced.

According to the embodiments described above, carbon dioxide capture rate can be enhanced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Further, it will be understood that these embodiments can be at least partially combined properly without departing from the spirit of the present invention.

The invention claimed is:

1. A carbon dioxide capture system comprising:
   an absorber having a first gas-liquid contact unit configured to bring exhaust gas and an absorbing liquid into contact with each other to cause carbon dioxide contained in the exhaust gas to be absorbed in the absorbing liquid; and
   a stripper configured to permit the carbon dioxide to be released from the absorbing liquid containing the carbon dioxide, the absorbing liquid being supplied from the absorber,
   wherein the absorber further has:
   a release region which is provided above the first gas-liquid contact unit, into which the absorbing liquid supplied from the stripper is introduced, and which is configured to allow the carbon dioxide to be released from the absorbing liquid;
   a second gas-liquid contact unit which is provided above the release region, and into which the carbon dioxide released in the release region is supplied together with the exhaust gas discharged from the first gas-liquid contact unit;
   an absorbing liquid supply device by which the absorbing liquid having released the carbon dioxide therefrom in the release region is supplied to the second gas-liquid contact unit; and
   a guide member configured to guide the absorbing liquid to the first gas-contact unit while bypassing the release region, the absorbing liquid having passed through the second gas-liquid contact unit, and
   wherein the second gas-liquid contact unit is configured to bring the exhaust gas and the absorbing liquid into contact with each other so as to cause the carbon dioxide contained in the exhaust gas to be absorbed in the absorbing liquid.

2. The carbon dioxide capture system according to claim 1, wherein the absorbing liquid supply device comprises a cooler configured to cool the absorbing liquid.

3. The carbon dioxide capture system according to claim 1, further comprising a decompression vessel in which the absorbing liquid being supplied from the stripper to the absorber is flashed so as to release the carbon dioxide from the absorbing liquid and capture the carbon dioxide.

4. The carbon dioxide capture system according to claim 3, further comprising a cooler configured to cool the absorbing liquid being supplied from the stripper to the absorber, wherein the cooler is disposed between the decompression vessel and the absorber.

5. The carbon dioxide capture system according to claim 3, further comprising an exhaust driving unit configured to exhaust the carbon dioxide released from the decompression vessel.

6. The carbon dioxide capture system according to claim 1, wherein the absorber further has a third gas-liquid contact unit which is provided above the second gas-liquid contact unit, and which brings the exhaust gas exhausted from the second gas-liquid contact unit and a cleaning liquid into contact with each other so as to cause the carbon dioxide contained in the exhaust gas to be absorbed in the cleaning liquid.

7. The carbon dioxide capture system according to claim 6, wherein the absorber further comprises a circulation device configured to circulate the cleaning liquid, wherein the circulation device includes a cooler configured to cool the cleaning liquid.

8. A method of capturing carbon dioxide in a carbon dioxide capture system, the carbon dioxide capture system comprising an absorber and a stripper, the absorber having a first gas-liquid contact unit configured to bring exhaust gas and an absorbing liquid into contact with each other so as to cause carbon dioxide contained in the exhaust gas to be absorbed in the absorbing liquid, the stripper configured to release the carbon dioxide from the absorbing liquid having absorbed therein the carbon dioxide supplied from the absorber, the method comprising:

introducing the absorbing liquid supplied from the stripper into a release region provided above the first gas-liquid contact unit so as to release the carbon dioxide from the absorbing liquid;

supplying the absorbing liquid, which has released the carbon dioxide therefrom in the release region, to a second gas-liquid contact unit provided above the release region;

supplying the carbon dioxide released in the release region to the second gas-liquid contact unit together with the exhaust gas discharged from the first gas-liquid contact unit;

bringing the exhaust gas and the absorbing liquid into contact with each other in the second gas-liquid contact unit to thereby cause the carbon dioxide contained in the exhaust gas to be absorbed in the absorbing liquid; and guiding the absorbing liquid, which has passed through the second gas-liquid contact unit, to the first gas-liquid contact unit while bypassing the release region.

* * * * *